April 1, 1969  D. A. WATKIN ET AL  3,435,685
APPARATUS FOR SAMPLING AND MEASURING PHYSICAL
PARAMETERS OF OBJECTS
Filed Oct. 21, 1966  Sheet 1 of 3

INVENTORS
D. A. Watkin,
E. J. Cooke and
C. J. Austen
BY
Watson, Cole, Grindle & Watson
ATTORNEYS April 1, 1969  D. A. WATKIN ET AL  3,435,685
APPARATUS FOR SAMPLING AND MEASURING PHYSICAL
PARAMETERS OF OBJECTS
Filed Oct. 21, 1966  Sheet 2 of 3
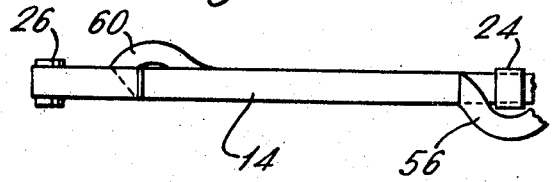
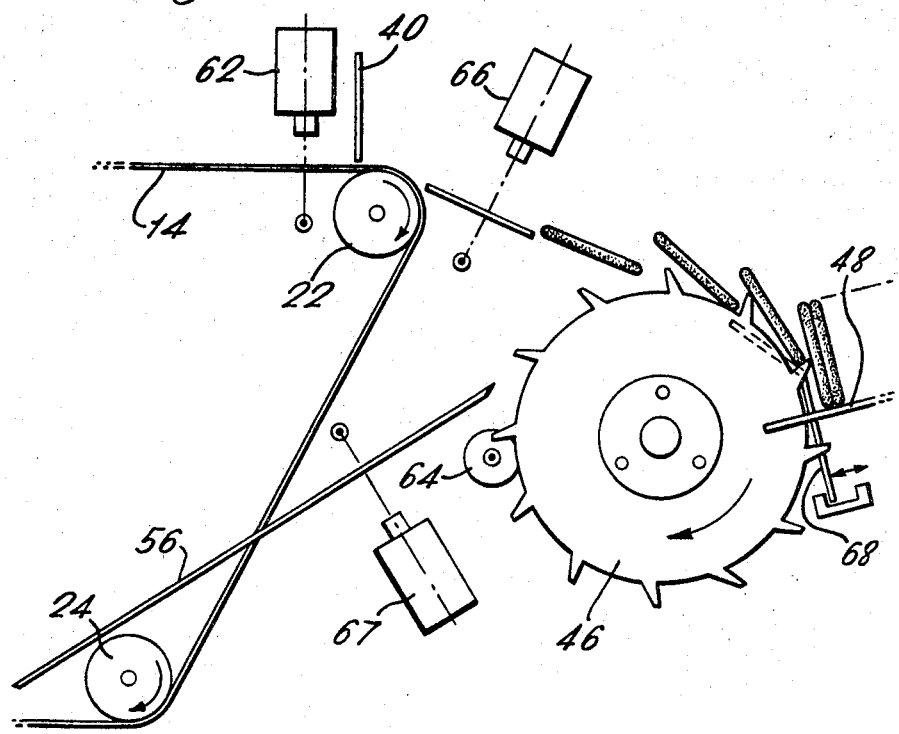
INVENTORS
D. A. Watkin
E. J. Coode and
C. J. Austen
BY Watson, Cole, Grindle &
Watson
ATTORNEYS

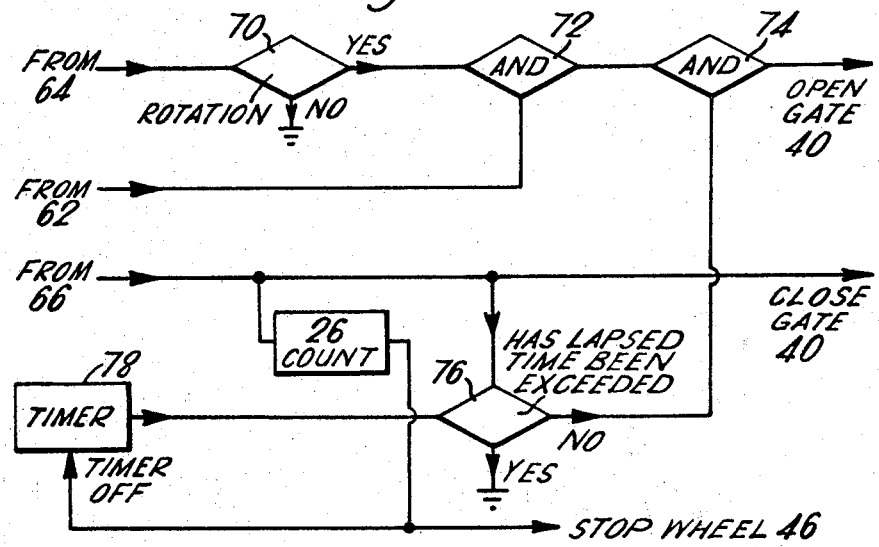
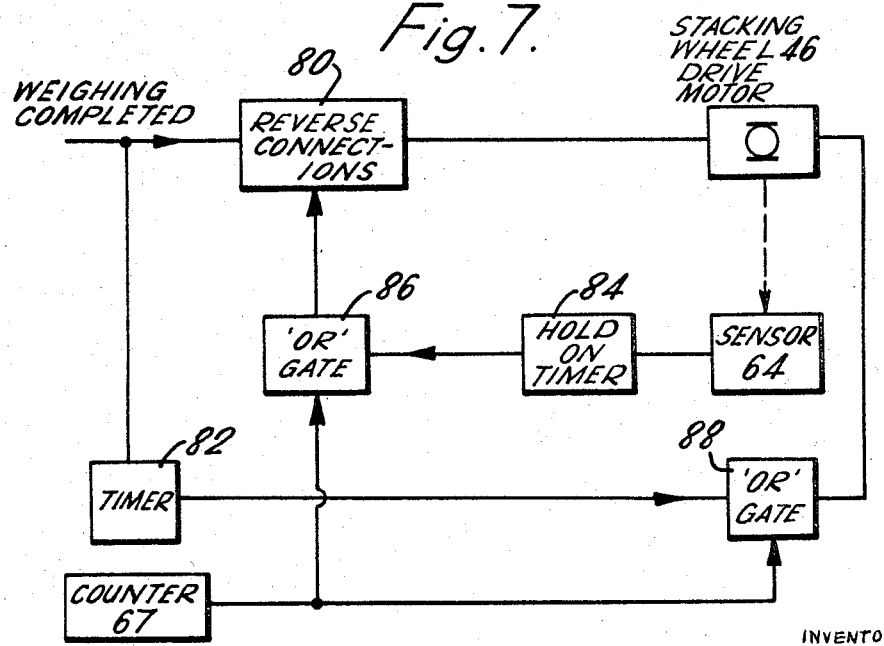

United States Patent Office 3,435,685
Patented Apr. 1, 1969

3,435,685
APPARATUS FOR SAMPLING AND MEASURING PHYSICAL PARAMETERS OF OBJECTS
David Anthony Watkin, Edward John Coode, and Cecil John Austen, Chislehurst, England, assignors to British Scientific Instrument Research Association, South Hill, Chislehurst, Kent, England, a British company
Filed Oct. 21, 1966, Ser. No. 588,381
Claims priority, application Great Britain, Oct. 22, 1965, 44,896/65
Int. Cl. G01n *33/00*
U.S. Cl. 73—432                                    6 Claims

ABSTRACT OF THE DISCLOSURE

Apparatus for sampling and measuring the physical properties of objects such as biscuits. An endless belt is provided for carrying a plurality of streams of biscuits away from an oven or the like and a second endless belt is provided for withdrawing one stream from said plurality of streams as a sample stream. A gate is provided for intermittently selecting a predetermined number of biscuits from said sample stream and a chute is arranged to return biscuits which have not been so selected from the sample stream to the first mentioned endless belt into the empty position thereon caused by the withdrawal of the sample stream. Means are provided for examining the physical properties of the selected group of biscuits and further means are arranged to return the selected group of biscuits into the empty position on the first mentioned endless belt at an instant when nonselected sample biscuits are not being returned thereto.

---

Figure 1:
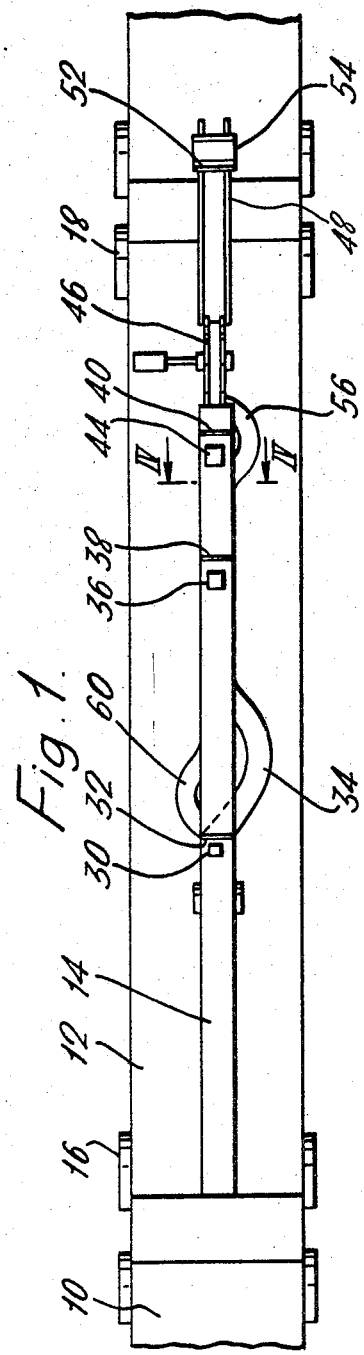

This invention relates to apparatus for sampling and measuring physical parameters of discrete objects and more particularly to apparatus for measuring physical parameters of objects having the form of discs or plates for example biscuits.

In the manufacture of objects such as biscuits it is important to be able to assess the quality of the resulting product in a rapid manner so that biscuits which do not meet required criteria will not be sold to the public. It has been proposed to measure the quality of biscuits by removing a sample of biscuits from the production line and then testing them in a laboratory equipped with suitable testing devices. However, this has the disadvantage that should the sample of biscuits fail to come up to the required standards, the remainder of the biscuits may have already been packed and may even have been dispatched from the factory.

The present invention has been made from a consideration of this difficulty.

According to the invention there is provided apparatus for sampling and measuring physical parameters of discrete objects, particularly biscuits, comprising means for conveying a plurality of streams of objects, an endless conveyor for continuously withdrawing at least one stream of objects as a sample stream from said plurality of streams, means for selecting a number of objects from said sample stream and for returning objects which are not selected to the conveying means at a point downstream of the position where the sample stream is withdrawn, said downstream point being also located such that returned objects take up vacant spaces on the conveying means created by withdrawal of objects by the sample conveyor, means for measuring at least one physical parameter of at least one object in the selected number of objects and means cooperable with said means for returning non-selected objects for returning selected objects to said point at an instant when non-selected objects are not being returned to the conveying means.

Examples of physical parameters which may be measured with the apparatus according to the invention are as follows:

(1) The overall length, or the diameter of one object or the overall length of a plurality of objects which are arranged in line with their edges touching.
(2) Estimation of the colour of an object.
(3) The height of one or of a stack of objects.
(4) The weight of one or of a plurality of objects.

In the case where the objects are biscuits the measurements numbered 1 to 4 are non-destructive. Thus, in a preferred embodiment of the invention all the sample biscuits may be returned to the production line after the non-destructive measurements have been made, provided of course that the sample has not fallen below the required standards. However, in order to estimate the moisture content of a biscuit it may be necessary to destroy the biscuit which is then of no further use.

Figure 2:
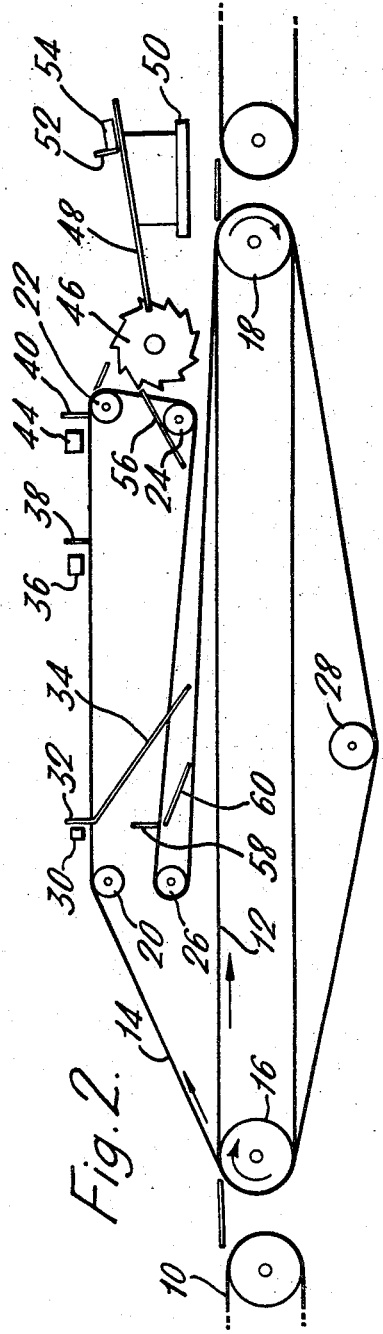

A specific embodiment of the invention will now be described by way of example with reference to the accompanying drawings in which:

FIGURE 1 is a diagrammatic plan view of an embodiment of the apparatus according to the invention;
FIGURE 2 is a side view of the apparatus shown in FIGURE 1;
FIGURE 3 is a plan view of part of the apparatus of FIGURE 2;
FIGURE 4 is a section taken along the line IV—IV of FIGURE 1;
FIGURE 5 shows in more detail part of the apparatus shown in FIGURE 2 for stacking the objects;
FIGURE 6 is a simplified circuit for controlling loading of the stacking wheel; and
FIGURE 7 is a simplified circuit for controlling unloading of the stacking wheel.

Referring to FIGURES 1 and 2 an endless conveyor 10 carries biscuits away from an oven (not shown), the biscuits being disposed on the conveyor in a single layer in substantially parallel rows. Sample biscuits are removed from the production line at the point where the endless conveyor 10 transfers the parallel rows of biscuits onto endless conveyor 12 by means of an endless sample conveyor 14 of considerably narrower width than the conveyor 12. The conveyor 12 is carried on two rollers 16, 18 and the sample conveyor 14 which moves in the same direction as the conveyor 12 (indicated in FIGURE 2 by an arrow) passes around the roller 16 outside the conveyor 12 and is then led, at an angle of approximately 20° to the horizontal, to the guide roller 20. From thence the sample conveyor 14 is led substantially horizontally to the guide roller 22, downwardly over guide roller 24, back over guide roller 26 and around the roller 18 on the outside of the conveyor 12. The sample conveyor 14 returns to the roller 16 over guide roller 28.

The sample conveyor 14 is driven at the same speed as the conveyor 12 by frictional contact over the rollers 16 and 18 or by independent driving means.

In operation the sample conveyor 14 continuously removes one of the parallel rows of biscuits, the position of the sample conveyor on the roller 16 being adjustable to remove any desired row. The biscuits on the sample conveyor are counted by counting means 30 which may be a photocell and which allows a predetermined number of biscuits to pass through the gate 32. When the gate 32 is closed the biscuits are deflected down the chute 34 onto the portion of the sample conveyor 14 between rollers 26 and 18 which transfers the biscuits back to the main production line.

The sample biscuits which have passed through the gate 32 are carried on the sample conveyor 14 to the counting means 36 which may be a photocell and which allows a certain number of the sample biscuits to pass through gate 38. In practice the number of biscuits passed through the gate 32 will be the same as the number of biscuits which are to be made up in a packet, for example twenty six. Of these twenty six biscuits, ten may be allowed through the gate 38. The ten biscuits are then carried towards the gate 40 which is closed at this stage and which thus causes the biscuits to form a line with their edges touching. As shown more clearly in FIGURE 4 the sample conveyor between the gates 38 and 40 is laterally tilted at an angle of about 30° to the horizontal so as to ensure that the biscuits form a straight line rather than a zig-zag formation and to reduce the tendency of the biscuits to rotate. Where the sample conveyor is tilted a fence 42 (FIGURE 4) is provided to prevent the biscuits from falling off the sample conveyor.

The gate 40 provides a fixed reference point which enables the overall length of the ten biscuits to be measured. In addition the colour of one biscuit, usually the first biscuit to contact gate 40, is measured by a colour comparator head 44. The colour comparator head is normally positioned over a colour reference source and means are provided (not shown) for repositioning the colour comparator head over one of the biscuits, usually the second, in the group of ten when the first biscuit contacts the gate 40. The colour estimation may, however, be carried out on any biscuit that is stationary anywhere on the sample conveyor for long enough.

When both the length and colour measurements have been made the colour comparator head returns to its normal position over the reference source, gtaes 38 and 40 open and the twenty six biscuits pass onto a toothed stacking wheel 46 whence they are transferred onto the rails 48 of a weighbridge 50 which may be a simple mechanical with the stacking wheel so that it will only be opened when the stacking wheel is in the correct position to receive a biscuit.

The stacking wheel consists of two toothed discs which may be made of stainless steel and which are mounted in parallel planes and spaced from one another such that the distance between the discs is less than the width of a biscuit. The discs are fixed relative to one another with their teeth in line so that a biscut picked up by the stacking wheel will rest on two teeth, i.e., one tooth on each disc. The stacking wheel is driven by a reversible electric motor through a frictional torque limiting device which permits the motor to continue rotating should the wheel become jammed, for example with biscuits.

A sliding member 52 serves to compact the stack of biscuits on the weighbridge and a measuring means 54 such as a transducer is provided on the sliding member for estimating the height of the stack of biscuits.

When these measurements have been made the stacking wheel is reversed and the biscuits are transferred from the weighbridge to the portion of the sample conveyor 14 between the rollers 26 and 24 via the chute 56 (FIGURE 3).

A tongue 68 (FIGURE 5) is provided between the two discs of the stacking wheel down which each biscuit slides during the stacking operation. The tongue is so positioned that during unstacking the wheel can only remove one biscuit at a time from the weighbridge thus preventing biscuits being placed on top of one another on the sample conveyor.

Gate 58 is held closed while a predetermined number of biscuits are removed from the sample conveyor for any tests which involve destruction of the biscuit for example tests of moisture content and the gate 58 is then opened to allow the biscuits to pass down the chute 60 and return to the production line. The opening of gate 58 is synchronised with the opening of gate 32 so that as a further sample of biscuits is admitted through gtae 32, the biscuits which have been tested are passed down the chute 60 to take the place of the further sample on the production line, taking up a position behind the last biscuit to descend down chute 34.

It will be understood that the means controlling the gates may be adjusted to admit any number of biscuits. Moreover the counter 36 and gate 38 may be omitted in which case the measurement of the overall length of a line of biscuits will be made to all the biscuits which pass through gate 32.

The measurements may be fed in the form of electronic signals to a suitable recording means such as a data logger or the electronic signals may be used to automatically control appropriate stages in the manufacture of the biscuits.

The sequence of gate operation and the measurement of the biscuits may be carried out by electronic means of which the following is an example.

Before a measuring cycle is started all the gates are closed except gate 38 and biscuits picked up by the sample conveyor are re-directed back to the production line by the chute 34. The measuring cycle is started by a pulse from a pulse generator which opens gates 32 and 58, and allows biscuits to be measured to pass through gate 32. At the same time biscuits which have been measured in a previous cycle are discharged down chute 60 back to the production line.

The photocell counting means 30 is coupled to a Schmitt trigger circuit via an amplifier. When the photocell is in darkness, i.e., covered by a biscuit the output from the Schmitt circuit is at a high logic level, for example 9 v., and when the photocell is unobstructed the output from the Schmitt circuit is at a low logic level for example 0 v. Thus each time the rear of the biscuit clears the photocell a negative going voltage step is obtained from the Schmitt circuit which is fed to a binary counter set to count a predetermined number—in this case twenty-six. When twenty-six biscuits have been counted a pulse is obtained from the counter which closes gates 32 and 58, resets the count twenty-six counter and provides a continuous signal to one output of an "and" gate controlling gate 40. Thereafter biscuits picked up by the sample conveyor 14 are redirected back to the production line via chute 34.

A similar arrangement of amplifier, Schmitt trigger circuit and binary counter is provided to receive the output from the photocell counting means 36 except that the binary counter is set to count ten and the signals from the photocell 36 are fed to the count ten counter through a normally closed electronic gate. When the measuring cycle is started the electronic gate is opened and pulses are fed from the photocell to the count ten counter. When the count ten counter has counted ten a pulse is obtained which closes the electronic gate, closes gate 38 resets the count ten counter and triggers a time circuit. The time circuit gives a delay sufficient for ten biscuits to line up against gate 40—say 1 second—whereafter the overall length of the ten biscuits is measured and the colour of one biscuit assessed.

One method of measuring the length of a line of biscuits consists of directing a parallel beam of light onto a line of photocells. The number of photocells covered will depend on the length of the line of biscuits and the voltage output from the photocells will depend on the number of covered photocells. Thus the output voltage is proportional to the length of the line of biscuits.

As mentioned previously the colour of a biscuit is assessed while the biscuits are stationary and being measured for overall length. The colour comparator head 44 may comprise a selenium cell which is normally positioned over a reference source. The output voltage from the selenium cell, which is usually amplified, is proportional to the colour and reflectance of the reference surface and the voltage is stored on a capacitor. The selenium cell swings over a stationary biscuit in the line of ten biscuits and provides a second output voltage proportional to the colour and reflectance of the biscuit. The second output voltage is applied to one input of a differential amplifier and the stored voltage proportional to the reference surface is applied to the other input of the differential amplifier. The output voltage from the differential amplifier is proportional to the difference in colour and reflectance between the reference surface and the tested biscuit.

When both the above measurements have been completed, a pulse which may be derived from one of the measuring circuits re-opens gate 38. Gate 40 remains closed until its controlling "and" gate receives, in addition to the continuous signal from the count twenty-six counter a signal from the photocell 62 (FIGURE 5) indicating that a biscuit is in contact with gate 40 and a signal from photocell 64 indicating that the teeth of the stacking wheel are correctly positioned to receive a biscuit. Gate 40 opens to pass one biscuit which passes in front of photocell 66 as a result of which the photocell provides a signal which closes gate 40. Gate 40 will then re-open only when its controlling "and" gate again receives the three signals described above.

The number of times gate 40 is opened is counted on a second count twenty-six counter which may be responsive to the gate 40 or to the photocell 66 and which thus counts the number of biscuits passed on to the stacking wheel. An alarm may be provided which will be actuated if the number of biscuits passed onto the stacking wheel differs from the number passed through gate 32.

The pulse produced by the count twenty-six counter after the twenty-sixth biscuit has passed photocell 30, is additionally utilised to start a timing device. This timing device is set to measure a time interval slightly longer than that normally required for the twenty-sixth biscuit to pass through gate 40, but is stopped if gate 40 has opened twenty-six times before the time interval has expired. If the timing device runs its full time without gate 40 having opened twenty-six times, which may signify that a jam of biscuits has developed in the stacking mechanism, then the motor driving the wheel 46 is stopped and an alarm is actuated by a pulse from the timing device.

When twenty-six openings of gate 40 have been counted a pulse produced by the second count twenty-six counter also initiates (after a time delay normally sufficient to allow all twenty-six biscuits to have arrived on the weighbridge track 48) the operations to be performed on the stacked biscuits. At the end of this delay the tongue 68 is moved for example by a solenoid, forward sufficiently far to ensure that the twenty-sixth biscuit is out of contact with the teeth of stacking wheel 46, the stacking wheel drive motor is stopped.

The height of the stack of biscuits and their weight are measured then on the weighbridge 50 by means of suitable transducers and a pulse is provided after the measurements have been made which reverses the stacking wheel so that the biscuits complete the cycle as outlined above.

The unstacking operations being after a time delay normally sufficiently long to allow these measurements to have been performed. The wheel 46 is restarted in the reverse or unstacking direction and the tongue 68 against which the last biscuit to arrive is resting moves back to its normal position.

When the stacking wheel 46 is started in the reverse direction in order to offload a sample of biscuits from weighbridge track 48 onto the chute 56, a second timing device is started. The second timing device is set to measure a time interval $t$ slightly longer than that required for two successive teeth of the wheel 46 to pass a given point when the wheel is rotating at its normal speed. Timing of the interval $t$ begins afresh each time a tooth of the wheel 46 passes in front of the photocell 64. If the second timing device runs for the full time interval $t$ without photocell 64 having signalled the passage of the next tooth of the wheel 46, then the direction of rotation of the wheel 46 immediately reverses to the forward or stacking direction, for, say one revolution, in order to try and clear any jam of biscuits which may have developed. Then the direction of rotation of wheel 46 reverts to the reverse or unstacking direction, again with the second timing device operating.

A photocell counter 67 is provided to count the biscuits as they are transferred back to the sample conveyor from the weighbridge.

A third timing device measures a time interval sufficiently long for twenty-six biscuits to be unloaded from the weighbridge 48 onto the chute 56 even if jamming occurs which causes the stacking wheel 46 to reverse its direction of motion several times at the behest of the second timing device during tht unloading operation. If the third timing device runs its full time without twenty-six biscuits having been counted past photocell 67 then the motor driving the wheel 46 is stopped and an alarm is actuated by a pulse, from the third timing device.

FIGURE 6 shows a circuit for controlling the feed of biscuits through gate 40 onto the stacking wheel. Signals from photocell 64 are fed to a decision box 70 to determine if rotation of wheel 64 is taking place. If wheel 46 is rotating then a signal is fed from the decision box 70 to an "and" gate 72 the other input to the "and" gate being derived from photocell 62 indicating that a biscuit is in position in front of gate 40. The output from "and" gate 72 is fed to a second "and" gate 74 which also receives signals from a decision box 76 provided that the time preset by timer 78 has not been exceeded, the preset time being longer than the time for 26 biscuits to pass gate 40. The output from "and" gate 74 is utilised to open gate 40.

A biscuit passing through gate 40 energizes photocell 66 which then closes gate 40. This cycle is repeated until 26 biscuits have passed through gate 40 whereafter the twenty-six count will produce a pulse which switches off timer 78 and stops the wheel 46.

Unloading of the stacking wheel may be controlled by a circuit as shown in FIGURE 7 when weighing and measuring of the stacked biscuits has been completed a pulse is produced by means (not shown). This pulse is fed to reverse connections means 80 for the stacking wheel drive motor 82 to start the wheel 46 turning in the unstacking direction. The pulse also starts up timer 82 which is preset to a time much longer than that required to unload twenty-six biscuits.

If sensor 64 indicates that wheel 46 is not rotating a signal is fed through hold on timer 84 "or" gate 86 to the reverse connections means whereby the stacking wheel is driven in the stacking wheel for a short interval.

Instead of one continuous sample conveyor 14 as shown in the drawings three separate endless conveyors may be provided, the first replacing the portion of conveyor 14 between roller 16 and gate 32, the second between gate 32 and roller 22 and the third between rollers 24 and 26. With this arrangement the conveyors preferably are driven at a higher speed than the conveyor 12 so that biscuits which are picked up will tend to be spaced apart. This embodiment enables the chute 56 to be straightened and counting of biscuits to be carried out as biscuits are transferred from the first to the second conveyor. A pick-up plate is provided for transferring the biscuits from the conveyor 10 onto the first conveyor and the pick-up plate may be positioned at any desired point across the width of the conveyor 10 or swung away altogether so that no biscuits are picked up thereby.

When 26 biscuits have been counted by photocell 67 a pulse is produced which is fed through "or" gate 88 to stop the stacking wheel and also through "or" gate 86 to set the stacking wheel drive motor connections to the stacking mode. Should the timer 82 reach its preset time before twenty-six biscuits have been counted by photocell 67 a pulse is produced which is fed to "or" gate 88 to stop the stacking wheel and which may also be used to sound an alarm.

What we claim is:

1. Apparatus for sampling and measuring physical parameters of discrete objects, particularly biscuits, comprising means for conveying a plurality of streams of objects, an endless sample conveyor for continuously withdrawing at least one stream of objects as a sample stream from said plurality of streams, means for selecting a predetermined number of objects from said sample stream and returning means for returning objects which are not selected to the conveying means at a point downstream of the position where the sample stream is withdrawn, said downstream point being also located such that returned objects take up vacant spaces on the conveying means created by withdrawal of objects by the sample conveyor, means for measuring at least one physical parameter of at least one object in the selected number of objects and means cooperable with said returning means for nonselected objects for returning selected objects to said point at an instant when nonselected objects are not being returned to the conveying means.

2. Apparatus as claimed in claim 1, and comprising a stacking wheel drivable in one direction for forming a stack of selected objects for measuring purposes and drivable in the reverse direction to unstack said selected objects to return said selected objects to said sample conveyor.

3. Apparatus as claimed in claim 2, and further comprising a weighbridge onto which the selected objects are stacked by the stacking wheel.

4. Apparatus as claimed in claim 2, wherein means are provided for measuring the height of said stack of selected objects.

5. Apparatus as claimed in claim 1, the means for measuring at least one physical parameter further comprises a colour comparator head and a colour reference source for testing the colour of at least one selected objects.

6. Apparatus as claimed in claim 1, wherein the means for measuring at least one physical parameter also comprises a gate for preventing movement of selected objects along the endless conveyor whereby the selected objects are lined up and means for measuring the overall length of the line of selected objects.

References Cited

UNITED STATES PATENTS

| | | | |
|---|---|---|---|
| 1,907,458 | 5/1933 | Stevenson | 198—102 X |
| 2,139,796 | 12/1938 | Blosser et al. | 198—102 |
| 2,359,641 | 10/1944 | Harlow | 73—421 |
| 2,995,026 | 8/1961 | Schmidt | 73—421 X |
| 3,111,034 | 11/1963 | Hostetler | 73—421 |
| 3,339,700 | 9/1967 | Wells | 73—421 |
| 3,360,722 | 12/1967 | Von Bethmann et al. | 73—421 X |

LOUIS R. PRINCE, *Primary Examiner.*

D. M. YASICH, *Assistant Examiner.*

U.S. Cl. X.R.

73—421; 250—223; 88—14; 214—2, 7